United States Patent
Kettenacker et al.

(10) Patent No.: US 8,423,248 B2
(45) Date of Patent: Apr. 16, 2013

(54) METHOD AND DEVICE FOR SPECIFYING AN OUTPUT VARIABLE OF A DRIVE UNIT

(75) Inventors: Guenter Kettenacker, Steinheim (DE); Christian Ruland, Remshalden (DE); Maria-Dolores Sanchez Moreno, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 1294 days.

(21) Appl. No.: 12/220,975

(22) Filed: Jul. 29, 2008

(65) Prior Publication Data

US 2009/0043464 A1    Feb. 12, 2009

(30) Foreign Application Priority Data

Jul. 30, 2007   (DE) .......................... 10 2007 035 722

(51) Int. Cl.
  *B60K 31/00*   (2006.01)
(52) U.S. Cl.
  USPC ................. 701/51; 180/171; 701/62; 701/93; 701/31.7
(58) Field of Classification Search ............ 701/51, 701/93, 94, 97, 62, 63, 31.7, 33.7; 180/170, 180/171
  See application file for complete search history.

(56) References Cited

U.S. PATENT DOCUMENTS

| | | | |
|---|---|---|---|
| 5,054,570 A | | 10/1991 | Naito et al. |
| 5,835,876 A * | | 11/1998 | Hathaway et al. ............... 701/62 |
| 6,064,938 A | | 5/2000 | Kamishima et al. |
| 6,151,542 A * | | 11/2000 | Yoshino et al. ................. 701/54 |
| 6,311,116 B1 * | | 10/2001 | Lee ................................. 701/70 |
| 7,289,892 B2 * | | 10/2007 | Isogai et al. ............... 73/115.02 |
| 2004/0254696 A1 * | | 12/2004 | Foerstner et al. ............... 701/29 |
| 2005/0171669 A1 * | | 8/2005 | Sato ................................ 701/51 |
| 2006/0047374 A1 * | | 3/2006 | Hashimoto et al. .............. 701/1 |
| 2006/0178797 A1 * | | 8/2006 | Larsen et al. ................... 701/54 |
| 2008/0306668 A1 * | | 12/2008 | Wang et al. ..................... 701/93 |
| 2008/0306669 A1 * | | 12/2008 | Wang et al. ..................... 701/93 |
| 2009/0076679 A1 * | | 3/2009 | Martini et al. .................. 701/34 |

FOREIGN PATENT DOCUMENTS

| | | |
|---|---|---|
| DE | 43 38 098 | 5/1995 |
| DE | 197 43 089 | 4/1999 |
| DE | 199 20 851 | 5/2000 |
| DE | 101 62 017 | 7/2003 |
| DE | 10 2004 047 925 | 4/2006 |

* cited by examiner

*Primary Examiner* — Paul N Dickson
*Assistant Examiner* — George Spisich
(74) *Attorney, Agent, or Firm* — Kenyon & Kenyon LLP

(57) ABSTRACT

In a method for checking the operation of specifying an output variable of a drive unit, when a setpoint value of the output variable is specified, a check is performed as to whether this specification of the setpoint is caused by an operation of the control element. If it is determined that this is not the case, then an error is detected.

12 Claims, 2 Drawing Sheets

METHOD AND DEVICE FOR SPECIFYING AN OUTPUT VARIABLE OF A DRIVE UNIT

BACKGROUND OF THE INVENTION

1. Field of the Invention

The present invention relates to a method and a device for specifying an output variable of a drive unit.

2. Description of Related Art

A device and a method for controlling the driving velocity of a vehicle are described in published German patent document DE 101 62 017, in which a setpoint velocity of the vehicle is specified by operating a control element.

BRIEF SUMMARY OF THE INVENTION

The method according to the present invention and the device according to the present invention for specifying an output variable of a drive unit have the advantage that, when specifying a setpoint value of the output variable, a check is performed as to whether this is caused by an operation of the control element, and an error is detected if this is not the case. In this manner, an erroneous specification of the setpoint value of the output variable may be detected in a simple manner. The erroneous specification of the setpoint value of the output variable is thus detected automatically. This also allows for an automatic implementation of an error response measure when an error is detected.

It is advantageous that a check is performed as to whether the setpoint value is specified, that, in the event that the check reveals that the setpoint value is specified, a check is performed as to whether prior to the first detection of the specification of the setpoint value the control element was operated and that, if this is not the case, an error is detected. In this manner, the error detection may be set up very simply by the temporal correlation that exists in the error-free case between the operation of the control element for specifying the setpoint value and the resulting actual specification of the setpoint value.

For this purpose, it is particularly advantageous that the error is detected only if no operation of the control element was detected or if the detection of the operation of the control element occurs more than a predefined temporal threshold value prior to the first detection of the specification of the setpoint value. In this manner it is possible to model definitely the temporal correlation between the operation of the control element for specifying the setpoint value and the actual specification of the setpoint value by the predefined threshold value and in this manner increase the reliability of the error detection.

Another advantage is obtained in that, in the event that no error was detected on account of the operation of the control element detected prior to the first detection of the specification of the setpoint value, the specification of the setpoint value is compared to a most recently specified setpoint value to see if there was a change and that, in the event that a change is detected that cannot be attributed to the detected type of operation of the control element, an error is detected nevertheless. In this manner it is possible to detect even an erroneous specification of the setpoint value due to the operation of the control element in a simple manner.

This thus allows for a more differentiated error detection.

Another advantage is obtained if, in the event that the specification of the setpoint value is increased with respect to the most recently specified setpoint value, an error is detected if an operation of the control element for lowering the setpoint value or for readopting the most recently specified setpoint value was detected. This represents a simple implementation of the error detection for an erroneously increased setpoint value.

It is also advantageous if, in the event that the specification of the setpoint value is lowered with respect to the most recently specified setpoint value, an error is detected if an operation of the control element for increasing the setpoint value or for readopting the most recently specified setpoint value was detected. In this manner it is possible to detect in a particularly simple manner an erroneous lowering of the setpoint value due to the operation of the control element.

It is advantageous that, in the event that no error was detected on account of the operation of the control element detected prior to the first detection of the specification of the setpoint value, the specification of the setpoint value is compared to a most recently specified setpoint value to see if there was a change and that, in the event that no change is detected, even though a type of operation of the control element was detected that causes a change of the setpoint value, an error is detected nevertheless. In this manner it is possible to detect in a simple manner an erroneous persistence of the setpoint value at the most recently specified setpoint value.

It is furthermore advantageous if an error response measure is initiated when an error is detected. In this manner it is possible to prevent an undesired erroneous operation of the drive unit.

Particularly advantageous is the use of a velocity or a rotational speed as an output variable. In this manner, the method according to the present invention and the device according to the present invention may be utilized, for example, in a velocity control system or in a rotational speed control system.

DETAILED DESCRIPTION OF THE INVENTION

Figure 1:
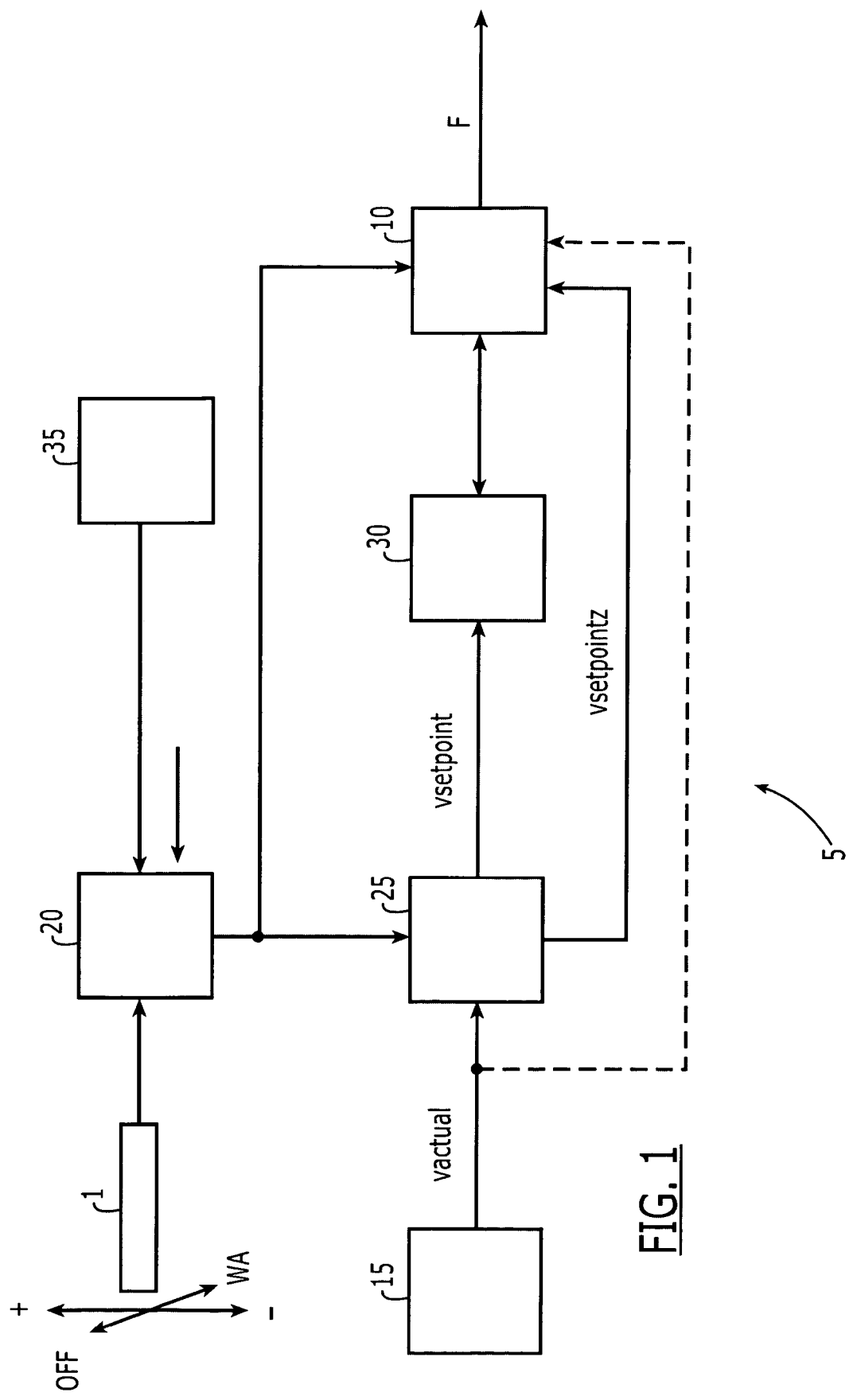
FIG. 1 shows a schematic diagram for explaining an example embodiment of the device according to the present invention.

In FIG. 1, 5 indicates a device for specifying an output variable of a drive unit. The drive unit may include, for example, an internal combustion engine or an electric motor or a hybrid drive made up of an internal combustion engine and an electric motor and may drive a vehicle for example. The internal combustion engine may be, for example, a diesel engine or a spark-ignition engine. Device 5 may be implemented, for example, as software and/or hardware in an engine control unit of the drive unit.

The output variable may be, for example, a torque, a power output, a velocity or a rotational speed.

In the following, it shall be assumed by way of example that the drive unit drives a vehicle and that the output variable of the drive unit is the velocity of the vehicle.

Device 5 includes a specifying unit 25, at the output of which the setpoint velocity vsetpoint is output. In this instance, setpoint velocity vsetpoint may be supplied, for example, to a cruise control in a manner not shown in FIG. 1. Device 5 furthermore includes a memory unit 30, the memory content of which is overwritten by the respectively current setpoint velocity value vsetpoint. Device 5 includes furthermore a detection unit 20, to which the signal of a control element 1 is supplied. Control element 1 may be a steering-column stalk of a cruise control, for example. It is movable in four directions, as shown in FIG. 1. By an upward movement of steering-column stalk 1 to the "plus position", a specified setpoint velocity vsetpoint is to be increased by a predefined increment, for example 1 kilometer per hour. If no setpoint velocity vsetpoint is currently specified, then a movement of steering-column stalk 1 to the "plus position" is to specify the current actual velocity vactual of the vehicle as the setpoint velocity vsetpoint. By a downward movement of the steering-column stalk to the "minus position", a specified setpoint velocity vsetpoint is to be lowered by a predefined decrement, for example 1 kilometer per hour. By moving steering-column stalk 1 forward to the "WA" position, the most recently specified setpoint velocity vsetpoint is to be specified again in the event that currently no setpoint velocity vsetpoint is specified. This is also described as a readoption. If steering-column stalk 1 is moved backward to the "OFF" position, then a currently specified setpoint velocity vsetpoint is to be deactivated such that no setpoint velocity vsetpoint is specified any longer. In this manner, the cruise control is deactivated together with specifying unit 25. The driving velocity must then be set by operating the accelerator pedal. Detection unit 20 detects the position of steering-column stalk 1 and transmits the detected position both to specifying unit 25 as well as to a verifying unit 10. Specifying unit 25 is also supplied with the actual velocity vactual of the vehicle from a detection unit 15, for example, a velocity sensor. Detection unit 15 may optionally also be located outside of device 5. Steering-column stalk 1 may optionally also be located outside of device 5. Detection unit 20, specifying unit 25, memory unit 30 and verifying unit 10, however, are components of device 5.

The most recently used setpoint velocity vsetpoint is stored in specifying unit 25. If specifying unit 25 is deactivated and receives from detection unit 20 the position "WA" as the current setting of steering-column stalk 1, then specifying unit 25 is activated and outputs as setpoint velocity vsetpoint the most recently used value for the setpoint velocity. If specifying unit 25 is deactivated, on the other hand, and receives from detection unit 20 the position "OFF" as the current position of steering-column stalk 1, then specifying unit 25 is deactivated and stores the value output until then for the setpoint velocity as the last setpoint velocity used. If specifying unit 25 is deactivated and received from the detection unit the position "plus" of steering-column stalk 1, then specifying unit 25 is activated and outputs the current actual velocity vactual as setpoint velocity vsetpoint. If specifying unit 25 is activated and receives from detection unit 20 the position "plus" of steering-column stalk 1, then the setpoint velocity vsetpoint that it outputs is increased by the described increment. If, by contrast, specifying unit 25 is activated and receives from detection unit 20 the position "minus" of steering-column stalk 1, then it lowers the output setpoint velocity vsetpoint by the decrement described above. The activation of specifying unit 25 is equivalent to the activation of the cruise control and the deactivation of specifying unit 25 is equivalent to the deactivation of the cruise control.

Verifying unit 10 scans the content of memory unit 30, for example, in a predefined scanning time grid. Furthermore, specifying unit 25 supplies to verifying unit 10 the stored most recently used value for setpoint velocity vsetpointz. When specifying unit 25 is activated, the most recently used value vsetpointz for the setpoint velocity is the setpoint velocity value most recently output by specifying unit 25 prior to a change to the current setpoint velocity value vsetpoint. In the case of the deactivated specifying unit 25, the most recently used value vsetpointz of the setpoint velocity is the setpoint velocity value used in the last activated operation of specifying unit 25.

In the event that specifying unit 25 is deactivated, it emits a neutral value at its output, by which memory unit 30 is also overwritten and on the basis of which the fact that specifying unit 25 is deactivated may be clearly detected.

Verifying unit 10 now verifies whether the scanned content of memory unit 30 differs from the neutral value, that is, whether specifying unit 25 is activated. If this is the case, then verifying unit 10 compares the current setpoint velocity vsetpoint of memory unit 30 to the most recently used setpoint velocity vsetpointz. If verifying unit 10 establishes a change, then it concludes that steering-column stalk 1 must have been operated, which resulted in this change. On the basis of the output signal of detection unit 20, verifying unit 10 verifies whether such an operation of steering-column stalk 1 was detected. If this is not the case, then an error signal is set at the output of verifying unit 10. In this case, the content of memory unit 30 was changed starting from the most recently used value vsetpointz without this being caused by an operation of steering-column stalk 1. An error therefore exists. On the other hand, if verifying unit 10 detects an operation of steering-column stalk 1 at a time that precedes the first detection of a change of the setpoint velocity output by specifying unit 25 by less than a predefined threshold value, then a reset error signal F is emitted at the output of verifying unit 10 such that no error is detected. Otherwise, that is, in the event of a detected operation of steering-column stalk 1 that occurred farther in the past than the predefined threshold value in comparison to the time of the first detected change of the setpoint velocity output by specifying unit 25, verifying unit 10 detects an error and output signal F of verifying unit 10 is set.

In this manner, an erroneous change of the setpoint velocity may be detected that is not triggered by an operation of steering-column stalk 1, but rather by an erroneous overwriting of memory unit 30. For this purpose, the threshold value for the time may be applied on a test stand, for example, in such a suitable manner that it is not greater than the ascertained maximum delay between an operation of steering-column stalk 1 and the resulting change of the content of memory unit 30. In this manner, a reliable error detection may be implemented.

A value of one second, for example, was ascertained as a suitable threshold value.

An error detection on the part of verifying unit 10 is optionally also possible in the event that the time delay between an operation of steering-column stalk 1 into the "plus" position, into the "minus" position or into the "WA" position and a subsequent change of the content of memory unit 30 is smaller than the predefined threshold value. In this case, verifying unit 10 verifies whether the change of the content of memory unit 30 correlates with the selected position in the operation of steering-column stalk 1. If in this instance verifying unit 10 determines an increase in the memory content of memory unit 30 in the event of a preceding operation of steering-column stalk 1 into the "minus" position or into the "WA" position, then an error is detected and error signal F is set. If verifying unit 10 determines a decrease of the memory content of memory unit 30 by more than one decrement in the event of a preceding operation of steering-column stalk 1 into the "minus" position, then an error is likewise established and error signal F is set. If verifying unit 10 determines a decrease in the memory content of memory unit 30 in the event of a preceding operation of steering-column stalk 1 into the "plus" position or into the "WA" position, then an error is detected and error signal F is set. If verifying unit 10 establishes an increase by more than one increment following a preceding operation of steering-column stalk 1 into the "plus" position, then an error is detected and error signal F is set. If verifying unit 10 determines a deviation between vsetpoint and vsetpointz following a preceding operation of steering-column stalk 1 into the "WA" position, then an error is likewise detected and error signal F is set. For this purpose, it shall be assumed that following an operation of steering-column stalk 1 into the "OFF" position the value vsetpointz in specifying unit 25 is not set to the neutral value, but rather remains at the most recently set value for the setpoint velocity. In this case, only the setpoint velocity vsetpoint output from specifying unit 25 to memory unit 30 is set to the neutral value.

If verifying unit 10 determines a setpoint velocity vsetpoint unequal to the neutral value in memory unit 30 following a preceding operation of steering-column stalk 1 into the "OFF" position, then an error is detected and error signal F is set.

If verifying unit 10 determines a change in the memory content of memory unit 30 from the neutral value to a value differing from the actual velocity vactual for setpoint velocity vsetpoint following a preceding operation of steering-column stalk 1 into the "plus" position, then an error is likewise detected and error signal F is set. For this purpose, the output of detection unit 15 is also supplied to verifying unit 10, as shown in FIG. 1 by a dashed line. If, in the event of a change in the memory content of memory unit 30 from the neutral value to a value differing from the neutral value for setpoint velocity vsetpoint, verifying unit 10 determines that an operation of steering-column stalk 1 into the "minus" position precedes it, then it detects an error and error signal F is set.

The value zero, for example, may be used as neutral value:

If error signal F is set, then this results in a first alternative design in an entry in an error memory. Additionally or alternatively, an error counter may be incremented with each set pulse of error signal F, an error being detected only if the error counter reading reaches or exceeds a predefined threshold value. Additionally or alternatively, an error response measure may be initiated when an error is detected, for example a deactivation of the cruise control or a limitation of the output torque of the drive unit for example as a function of the extent to which the actual velocity vactual exceeds setpoint velocity vsetpoint. Alternatively, as an error response measure, the drive unit may also be shut down entirely.

Figure 2:
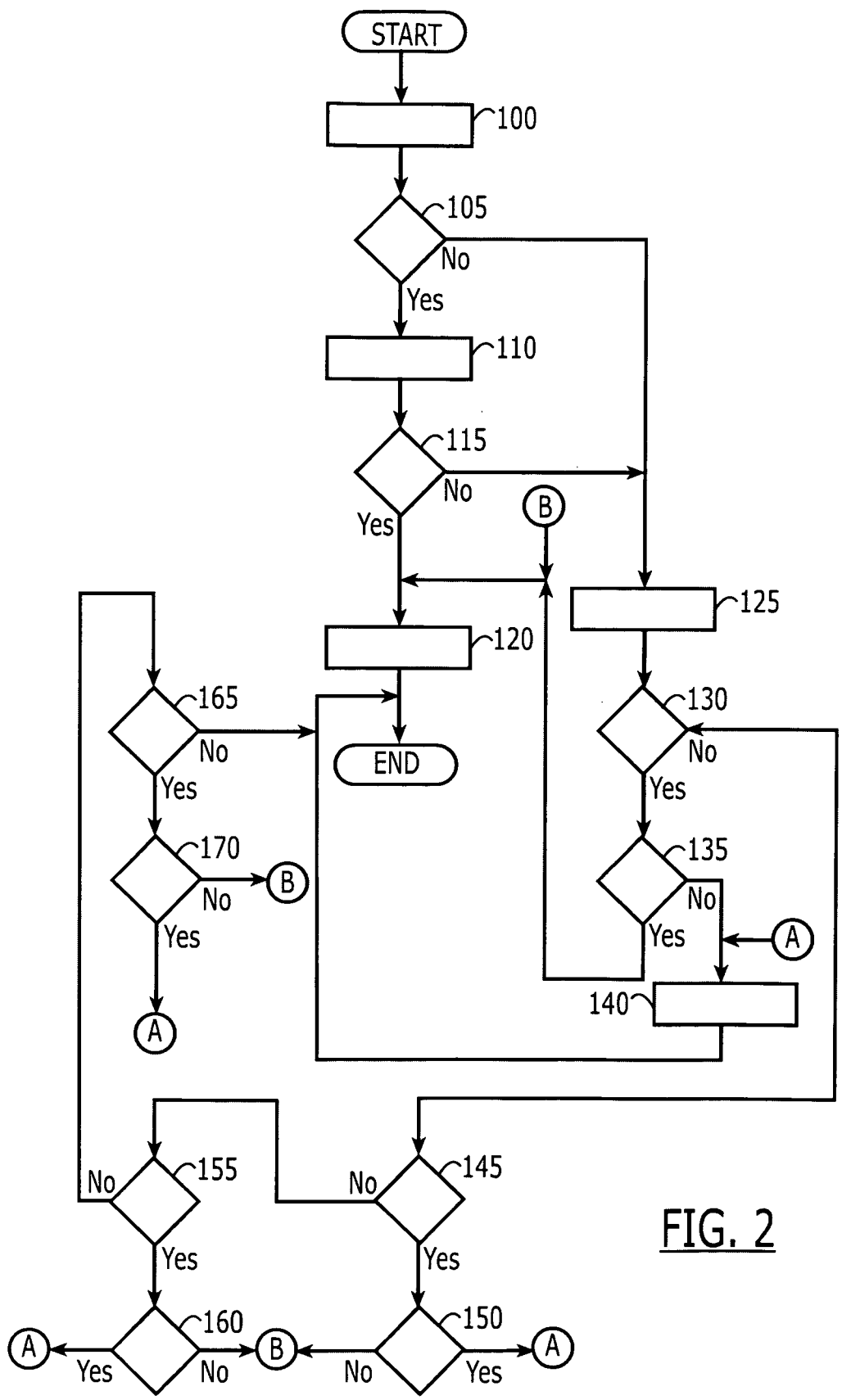
FIG. 2 shows a flowchart illustrating an exemplary sequence of the method according to the present invention.

FIG. 2 shows a flow chart of an exemplary sequence of the method according to the present invention. Following a start of the program, verifying unit 10 at a program point 100 scans memory unit 30 at a predefined scanning time, for example in a predefined scanning time grid. For this purpose, the flow chart shown in FIG. 2 may be run through for each of these scanning times. Subsequently, the method branches to a program point 105.

At program point 105, the verifying unit verifies whether the setpoint value vsetpoint read out from memory unit 30 at program point 100 differs from the previous setpoint value vsetpointz. If this is the case, then the method branches to a program point 120; otherwise, the method branches to a program point 125.

At program point 110, verifying unit 10 verifies, on the basis of the recorded output signal of detection unit 20, when the last operation of steering-column stalk 1 took place. Subsequently, the method branches to a program point 115.

At program point 115, verifying unit 10 verifies whether the last operation of steering-column stalk 1 took place further in the past than the predefined threshold value. If this is the case, then the method branches to a program point 120; otherwise, the method branches to a program point 125.

At program point 120, error signal F is set at the output of verifying unit 10. Subsequently the program is exited.

At program point 125, verifying unit 10 verifies, on the basis of the recorded signal received from detection unit 20, what type of operation was the last operation of steering-column stalk 1. Subsequently, the method branches to a program point 130.

At program point 130, verifying unit 10 verifies whether the last operation of steering-column stalk 1 was an operation into the "WA" position. If this is the case, then the method branches to a program point 135; otherwise, the method branches to a program point 145.

At program point 135, verifying unit 10 verifies whether the currently scanned value of the memory content of memory unit 30 differs from the value vsetpointz. If this is the case, then the method branches to program point 120; otherwise the method branches to a program point 140.

At program point 140, a reset error signal F is emitted by verifying unit 10. Subsequently the program is exited.

At program point 145, verifying unit 10 verifies whether the last operation of steering-column stalk 1 was an operation into the "plus" position. If this is the case, then the method branches to a program point 150; otherwise, the method branches to a program point 155.

At program point 150, verifying unit 10 verifies whether the memory content of memory unit 30 is greater by one increment than the value vsetpointz or whether the memory content of memory unit 30 was changed starting from the neutral value to the actual velocity vactual. If this is the case, then the method branches to program point 140, otherwise the method branches to program point 120.

At program point 155, verifying unit 10 verifies, on the basis of the recorded characteristic of the output signal of detection unit 20, whether the last operation of steering-column stalk 1 was an operation into the "minus" position. If this is the case, then the method branches to a program point 160; otherwise, the method branches to a program point 165.

At program point 160, verifying unit 10 verifies whether the memory content of memory unit 30 is lowered by one decrement with respect to the value vsetpointz or whether the memory content of memory unit 30 corresponds to the neutral value. If this is the case, then the method branches to program point 140, otherwise the method branches to program point 120.

At program point 165, verifying unit 10 verifies whether the last operation of steering-column stalk 1 was an operation into the "OFF" position. If this is the case, then the method branches to a program point 170, otherwise the program is exited.

At program point 170, verifying unit 10 verifies whether the memory content of memory unit 30 corresponds to the neutral value. If this is the case, then the method branches to program point 140, otherwise the method branches to program point 120.

Whenever setpoint value vsetpoint changes, the value prior to the change is stored in the value vsetpointz, unless the value prior to the change was the neutral value.

As an alternative to the velocity, the output variable of the drive unit may also be a rotational speed of the drive unit. For this purpose, for example, a setpoint rotational speed may be specified with the aid of a corresponding control element 1 in the same manner as the above-described setpoint velocity and be set in the context of a rotational-speed control.

Furthermore, a vehicle brake 35 is depicted in FIG. 1, which likewise is not necessarily part of device 5 and at the operation of which a corresponding operation signal is transmitted to detection unit 20. In this instance, an operation of vehicle brake 35 is interpreted by detection unit 20 in the same way as the operation of steering-column stalk 1 into the "OFF" position and results, in an error-free operation, in a deactivation of the cruise control and of specifying unit 25. In such a deactivation, verifying unit 10 is unable to distinguish whether it is caused by an operation of steering-column stalk 1 into the "OFF" position or by an operation of vehicle brake 35. The error detection system is unable to differentiate the operation of steering-column stalk 1 into the "OFF" position from the operation of vehicle brake 35 such that the operation of vehicle brake 35 has the same effect on the described error detection system as the operation of steering-column stalk 1 into the "OFF" position.

In the event of the operation of steering-column stalk 1 into the "OFF" position or in the event of the operation of vehicle brake 35, setpoint velocity vsetpoint is set to the neutral value, which in the present invention is likewise regarded as a specification of the setpoint value of the output variable, in this case the vehicle velocity.

What is claimed is:

1. A method for checking an operation of specifying an output variable of a drive unit, wherein a setpoint value for the output variable is specified by a control element in normal operation, the method comprising:
   detecting a specification of the setpoint value for the output variable;
   performing a check to determine whether the specification of the setpoint value is caused by an operation of the control element; and
   detecting an error if it is determined that the specification of the setpoint value is not caused by the operation of the control element, wherein a check is performed regarding whether the setpoint value is specified, and if the setpoint value is specified, a further check is performed regarding whether prior to the first detection of the specification of the setpoint value the control element was operated, and if this is not the case, an error is detected; and
   in the event that no error is detected on account of the operation of the control element detected prior to the first detection of the specification of the setpoint value, comparing the specification of the setpoint value to a most recently specified setpoint value to determine whether a change occurred, and if a change is detected that cannot be attributed to an operation of the control element, an error is detected.

2. The method as recited in claim 1, wherein the error is detected only if one of: a) no operation of the control element is detected; or b) if the detection of the operation of the control element occurred more than a predefined temporal threshold value prior to the first detection of the specification of the setpoint value.

3. The method as recited in claim 1, wherein, in the event that the specification of the setpoint value is increased with respect to the last specified setpoint value, an error is detected if an operation of the control element for one of lowering the setpoint value or for re-adopting the last specified setpoint value is detected.

4. The method as recited in claim 1, wherein, in the event that the specification of the setpoint value is lowered with respect to the last specified setpoint value, an error is detected if an operation of the control element for one of increasing the setpoint value or for re-adopting the last specified setpoint value is detected.

5. The method as recited in claim 1, wherein an error response measure is initiated when an error is detected.

6. A method for checking an operation of specifying an output variable of a drive unit, wherein a setpoint value for the output variable is specified by a control element in normal operation, the method comprising:
   detecting a specification of the setpoint value for the output variable;
   performing a check to determine whether the specification of the setpoint value is caused by an operation of the control element; and
   detecting an error if it is determined that the specification of the setpoint value is not caused by the operation of the control element, wherein a check is performed regarding whether the setpoint value is specified, and if the setpoint value is specified, a further check is performed regarding whether prior to the first detection of the specification of the setpoint value the control element was operated, and if this is not the case, an error is detected; and
   in the event that no error is detected on account of the operation of the control element detected prior to the first detection of the specification of the setpoint value, comparing the specification of the setpoint value to a most recently specified setpoint value to determine whether a change occurred, and if no change is detected, even though a type of operation of the control element was detected that causes a change of the setpoint value, an error is detected.

7. A device for specifying an output variable of a drive unit, comprising:
   a control element, wherein a setpoint value for the output variable is specified by operation of the control element; and
   a verification unit configured to verify whether a specification of the setpoint value of the output variable is caused by an operation of the control element;
   wherein the verification unit detects an error if the specification of the setpoint value of the output variable is not caused by the operation of the control element, wherein a check is performed regarding whether the setpoint value is specified, and if the setpoint value is specified, a further check is performed regarding whether prior to the first detection of the specification of the setpoint value the control element was operated, and if this is not the case, an error is detected, and
   wherein in the event that no error is detected on account of the operation of the control element detected prior to the first detection of the specification of the setpoint value, the specification of the setpoint value is compared to a most recently specified setpoint value to determine whether a change occurred, and if a change is detected that cannot be attributed to an operation of the control element, an error is detected.

8. The device as recited in claim 7, wherein the error is detected only if one of: a) no operation of the control element is detected; or b) if the detection of the operation of the control element occurred more than a predefined temporal threshold value prior to the first detection of the specification of the setpoint value.

9. The device as recited in claim 7, wherein, in the event that the specification of the setpoint value is increased with respect to the last specified setpoint value, an error is detected if an operation of the control element for one of lowering the setpoint value or for re-adopting the last specified setpoint value is detected.

10. The device as recited in claim 7, wherein, in the event that the specification of the setpoint value is lowered with respect to the last specified setpoint value, an error is detected if an operation of the control element for one of increasing the setpoint value or for re-adopting the last specified setpoint value is detected.

11. The device as recited in claim 7, wherein an error response measure is initiated when an error is detected.

12. A device for specifying an output variable of a drive unit, comprising:
- a control element, wherein a setpoint value for the output variable is specified by operation of the control element; and
- a verification unit configured to verify whether a specification of the setpoint value of the output variable is caused by an operation of the control element;

wherein the verification unit detects an error if the specification of the setpoint value of the output variable is not caused by the operation of the control element, wherein a check is performed regarding whether the setpoint value is specified, and if the setpoint value is specified, a further check is performed regarding whether prior to the first detection of the specification of the setpoint value the control element was operated, and if this is not the case, an error is detected, and wherein in the event that no error is detected on account of the operation of the control element detected prior to the first detection of the specification of the setpoint value, the specification of the setpoint value is compared to a most recently specified setpoint value to determine whether a change occurred, and if no change is detected, even though a type of operation of the control element was detected that causes a change of the setpoint value, an error is detected.

\* \* \* \* \*